United States Patent [19]

West et al.

[11] Patent Number: 4,685,771

[45] Date of Patent: Aug. 11, 1987

[54] LIQUID CRYSTAL DISPLAY MATERIAL COMPRISING A LIQUID CRYSTAL DISPERSION IN A THERMOPLASTIC RESIN

[76] Inventors: John L. West, 5050 Fish Creek Rd., Stow, Ohio 44224; Joseph W. Doane, 1618 S. Lincoln St.; Slobodan Zumer, 917 Allerton St., both of Kent, Ohio 44240

[21] Appl. No.: 866,216

[22] Filed: May 22, 1986

Related U.S. Application Data

[63] Continuation-in-part of Ser. No. 776,831, Sep. 17, 1985, which is a continuation-in-part of Ser. No. 590,996, Mar. 19, 1984, abandoned.

[51] Int. Cl.$^4$ ................................. G02F 1/13
[52] U.S. Cl. .................. 350/347 V; 350/320; 350/350 R
[58] Field of Search ............... 350/320, 347 R, 347 V, 350/350 R, 351

[56] References Cited

U.S. PATENT DOCUMENTS

| | | | |
|---|---|---|---|
| 2,123,902 | 7/1938 | Land . | |
| 3,529,156 | 9/1970 | Fergason et al. . | |
| 3,578,844 | 5/1971 | Churchill et al. | 350/351 |
| 3,585,381 | 6/1971 | Hodson et al. | 250/47 |
| 3,600,060 | 8/1971 | Churchill et al. | 350/351 X |
| 3,620,889 | 11/1971 | Baltzer | 161/5 |
| 3,661,142 | 5/1972 | Flam | 128/2 H |
| 3,663,390 | 5/1972 | Fergason et al. | 204/158 HE |
| 3,697,297 | 10/1972 | Churchill et al. | 350/351 |
| 3,720,623 | 3/1973 | Cartmell et al. | 252/316 |
| 3,746,426 | 7/1973 | Masi . | |
| 3,748,017 | 7/1973 | Yamamura et al. . | |
| 3,766,061 | 10/1973 | Mahler et al. . | |
| 3,771,855 | 11/1973 | Burns . | |
| 3,772,518 | 11/1973 | Murayama et al. | 250/211 R |
| 3,781,085 | 12/1973 | Leibowitz . | |
| 3,795,529 | 3/1974 | Cartmell et al. . | |
| 3,804,618 | 4/1974 | Forest et al. | 96/1 R |
| 3,816,786 | 6/1974 | Churchill et al. | 313/91 |
| 3,852,092 | 12/1974 | Patterson et al. | 117/36.7 |
| 3,864,023 | 2/1975 | Glaser et al. | 117/217 X |
| 3,872,050 | 3/1975 | Benton et al. | 260/37 N |
| 3,877,790 | 4/1975 | Robinson . | |
| 3,885,982 | 5/1975 | Fergason | 106/252 |
| 3,892,471 | 7/1975 | Biermann et al. | 313/517 X |
| 3,912,366 | 10/1975 | Sprokel . | |
| 3,932,024 | 1/1976 | Yaguchi et al. . | |
| 3,935,337 | 1/1976 | Taylor | 427/180 |
| 3,961,843 | 6/1976 | Nakamura et al. . | |
| 3,969,264 | 7/1976 | Davis . | |
| 3,985,427 | 10/1976 | Masi . | |
| 3,990,782 | 11/1976 | Yamasaki . | |
| 3,998,210 | 12/1976 | Nosari | 128/2 H |

(List continued on next page.)

FOREIGN PATENT DOCUMENTS

| | | | |
|---|---|---|---|
| 2139537 | 1/1973 | France | 350/331 R |
| 55-96922 | of 0000 | Japan . | |
| 51-30998 | 9/1976 | Japan . | |

OTHER PUBLICATIONS

Craighead et al., "New Display Based on Electrically Induced Index Matching in an Inhomogeneous Medium", Appl. Phys. Lett., vol. 40, No. 1, 1 Jan. 1982, pp. 22-24.

Primary Examiner—Bruce Y. Arnold
Assistant Examiner—Richard F. Gallivan
Attorney, Agent, or Firm—Watts, Hoffmann, Fisher & Heinke Co.

[57] ABSTRACT

The invention provides a new liquid crystal display material prepared by the phase separation of a homogeneous solution of liquid crystal and thermoplastic resin to create in situ microdroplets of liquid crystal within a set transparent resin matrix. The new display material is characterized by ease of fabrication and the ability to be reworked by simple heating and cooling of the thermoplastic resin containing microdroplets of liquid crystal. It has been discovered that such a material fabricated from a thermoplastic resin and a liquid crystal having a liquid crystalline phase to isotropic phase transition temperature above the softening temperature of the resin exhibits a reversible field-independent memory.

22 Claims, 9 Drawing Figures

U.S. PATENT DOCUMENTS

| | | | |
|---|---|---|---|
| 4,022,706 | 5/1977 | Davis | 252/299.1 |
| 4,023,890 | 5/1977 | Shirasu et al. | |
| 4,048,358 | 9/1977 | Shanks | 350/351 X |
| 4,070,912 | 1/1978 | McNaughton et al. | 73/356 |
| 4,161,557 | 7/1979 | Suzuki et al. | 428/1 |
| 4,200,361 | 4/1980 | Malvano et al. | 350/336 |
| 4,218,281 | 8/1980 | Doriguzzi et al. | 156/281 |
| 4,297,401 | 10/1981 | Chern et al. | 428/1 |
| 4,301,023 | 11/1981 | Schuberth et al. | 252/299.1 |
| 4,310,557 | 1/1982 | Davison et al. | 428/1 |
| 4,325,610 | 4/1982 | Inoue | 350/343 |
| 4,388,139 | 6/1983 | Fuller | 156/307.5 |
| 4,401,537 | 8/1983 | Chern et al. | 204/159.11 |
| 4,418,102 | 11/1983 | Ferrato | 428/1 |
| 4,427,888 | 1/1984 | Galvin | 250/331 |
| 4,435,047 | 3/1984 | Fergason | 350/350 R X |
| 4,468,137 | 8/1984 | Hilsum et al. | 374/160 |
| 4,470,668 | 9/1984 | Inoue et al. | 350/343 |
| 4,550,171 | 10/1985 | Mockli | 548/159 |
| 4,556,289 | 12/1985 | Fergason | 350/350 R |
| 4,596,445 | 6/1986 | Fergason | 350/347 V X |
| 4,601,545 | 7/1986 | Kern | 350/347 V |

LIQUID CRYSTAL DISPLAY MATERIAL COMPRISING A LIQUID CRYSTAL DISPERSION IN A THERMOPLASTIC RESIN

RELATED APPLICATIONS

This application is a continuation-in-part of U.S. patent application Ser. No. 776,831, filed Sept. 17, 1985, which is a continuation-in-part of U.S. patent application Ser. No. 590,996, filed Mar. 19, 1984, now abandoned.

TECHNICAL FIELD

This invention relates generally to liquid crystal display technology and, more specifically, to the manufacture of a new liquid crystal display material comprising liquid crystal microdroplets dispersed in a thermoplastic resin. The new material is characterized by ease of preparation and the capability of having an erasable, field-independent image memory.

BACKGROUND ART

Recent developments in the fabrication of liquid crystal display devices have been directed toward materials which display images by exploiting the light scattering properties of liquid crystal entrapped in discrete quantities in a matrix. Such materials avoid the sealing problems encountered in conventional cell-type displays and make possible the fabrication of displays with a larger surface area than achievable with cell-type displays. Proposed types of materials include materials containing encapsulated liquid crystals, and materials with micropores into which liquid crystals are imbibed.

One prior art proposal for encapsulating liquid crystals is disclosed in French Patent No. 2,139,537 and involves forming an aqueous emulsion of nematic or cholesteric liquid crystal material with an immiscible binder such a polyvinyl alcohol. The mixture is emulsified in a high speed blender or the like to form droplets of the liquid crystal that are encapsulated by the binder. The encapsulated droplets are then coated onto a clear plastic substrate having the usual conducting electrodes. A similar technique is described in U.S. Pat. No. 4,435,047.

A prior art proposal involving filling the open or connected micropores of a plastic sheet with a nematic or other type of liquid crystal is disclosed in U.S. Pat. No. 4,048,358.

Electrical manipulation of these materials between light scattering and light transmissive modes causes the materials, or imaging forming segments thereof, to appear opaque in one state and transparent in another state. Thermal manipulation of the materials by the application of sufficient heat to induce a transition from the liquid crystalline, light scattering state to the isotropic, light transmissive state causes the materials to switch from an opaque to a clear state.

Preferred liquid crystals for light scattering displays are of the nematic or smectic type and may have either positive or negative dielectric anisotropy. Nematic liquid crystals are, of the two types of liquid crystals, most readily responsive to applied fields because nematics display the least order, have the fewest constraints on molecular orientation, and generally have the lowest vicosity. Light scattering liquid crystals have an extraordinary index of refraction $n_e$ measured along their long axis which is greater than their ordinary index of refraction $n_o$ measured in a plane perpendicular to that axis. The long axis defines the optic axis of the liquid crystal. Light scattering liquid crystals having positive dielectric anisotropy respond to an applied electric field by aligning their optic axes parallel to the direction of the field; those having negative dielectric anisotropy respond by aligning their optic axes perpendicular to the field direction.

Light incident upon materials containing discrete areas of liquid crystals is either scattered or transmitted depending upon the relationship among the indices. For example, in devices employing nematic liquid crystals with positive dielectric anisotropy, the matrix is formed from a resin having an index of refraction $n_s$ substantially equal to the ordinary index of refraction $n_o$ of the liquid crystal. In the absence of an applied field, the liquid crystals entrapped in the generally spherical droplets have no preferred direction in which to align so that incident light encounters a mismatch between the index $n_s$ of the resin and the extraordinary index $n_e$ of the liquid crystal and is scattered. Application of a field causes alignment of the molecules with a resultant alignment of the extraordinary indices (optic) axes for each discrete quantity of liquid crystal. Alignment of the optic axes normal to a surface upon which light is incident causes the droplets to present a refractive index of $n_o$ for that light; since $n_o$ is essentially equal to $n_s$, the incident light detects no mismatch between the indices and is transmitted so that the material appears clear. Such devices are disclosed in co-pending U.S. application Ser. No. 776,831.

Another operational principal of light scattering devices employing nematic liquid crystals having negative dielectric anisotropy is dynamic scattering. In these devices an applied voltage sets up a turbulence in the liquid crystals which scatters incident light. The visual effect of applying an external field to a dynamic scattering-type device is opposite to that described above. These devices display no scattering and are transparent in the absence of an applied field, while in the presence of a field, scatter and appear opaque. The scattering is due to the turbulence created in the liquid crystals by the applied field. Such a device is disclosed in French Patent No. 2,139,537.

Images may be displayed on light scattering and dynamic scattering liquid crystal devices by sandwiching a sheet or film of liquid crystal in a matrix between conductive electrodes and selectively energizing various segments or picture elements in known fashions to form alphanumeric character displays. As shown in U.S. Pat. No. 4,435,047, the picture elements of a nematic with positive dielectric anisotropy liquid crystal display to which a voltage is applied appear clear whereas segments without an applied voltage remain opaque; and in French Patent No. 2,139,537 the segments of a nematic with negative dielectric anisotropy liquid crystal device exhibit the opposite effect. A variable scattering device which exhibits images in a gray scale as in U.S. Pat. No. 4,411,495 is possible by varying the intensity of the applied segmental electric field to vary the difference in that segment between the effective indices of refraction of the liquid crystal and the matrix. The greater this difference, the more scattering and more opaque the segment.

The preparation of most of these displays involves the mechanical entrapping of discrete quantities of liquid crystals in a transparent matrix. Mechanical entrapment by encapsulation has the drawback of forming a relatively broad range of droplet diameters, so that sieving or sizing may be necessary to achieve uniform capsule sizes. Mechanical entrapment by imbibing into uniformly sized micropores overcomes the problem of diameter variation, but presents sealing difficulties. Furthermore, the operation of most of these types of liquid crystal displays depends upon a constant application of an external field, either electric or thermal, to maintain an image. While this mode of operation is desirable for displays of time and temperature, for instance, in which sundry alphanumeric characters are created and subsequently erased by the constant energizing and de-energizing of various picture elements, it would be advantageous in many instances to have a display technology characterized not only by greater ease of preparation but also by image display not dependent upon the constant presence of an applied field.

Co-pending U.S. patent application Ser. No. 776,831, the disclosure of which is incorporated by reference, describes a material comprising droplets of liquid crystal dispersed in a solid, cured thermosetting resin prepared by dissolving the liquid crystals in an uncured resin, such as epoxy, and curing the resin so that droplets of liquid crystal spontaneously form throughout the resin during curing.

As distinguished from prior art describing mechanical entrapment of light scattering liquid crystals U.S. patent application Serial No. 776,831 describes a material having the advantages of ease of preparation, control of droplet size and theoretically unlimited display size.

DISCLOSURE OF THE INVENTION

The invention provides a new liquid crystal display material prepared by the phase separation of a homogeneous solution of liquid crystal and thermoplastic resin to create in situ microdroplets of liquid crystal within a set transparent resin matrix. The new display material is characterized by ease of fabrication and the ability to be reworked by simple heating and cooling of the thermoplastic resin containing microdroplets of liquid crystal. It has been discovered that such a material fabricated from a thermoplastic resin and a liquid crystal having a liquid crystalline phase to isotropic phase transition temperature above the softening temperature of the resin exhibits a reversible field-independent memory.

As used in the specification and claims, the term "thermoplastic resin" means any synthetic resin or plastic which can be softened by heating and then rehardened by cooling. It is to be understood that softening of the resin upon the application of thermal energy can occur over a transition temperature range and is not necessarily characterized by a sharp demarcation. Within this range, the "softened" resin may be characterized as elastic or deformable at the lower temperature end of the range, and tacky or flowable at the higher temperature end. Below the transition temperature range the "hardened" resin may be characterized as inelastic, showing little or no deformation with applied pressure, or rubbery, showing some temporary deformation upon the application of pressure. For purposes of achieving a field-independent memory material, a resin is "soft" or "softened" when it is heated to a "softening temperature" at which it is capable of interacting with liquid crystal oriented by an external field so that the liquid crystal remains oriented when the resin is rehardened and the field removed. An "unset" resin may be a cured resin heated to a temperature sufficient to cause dissolution of the liquid crystal; an "unset" resin may also be an uncured resin or a cured resin dissolved in a solvent in which the liquid crystal is soluble. The terms "set" and "setting" refer to the conversion of an unset resin to a hardened condition by removal of thermal energy (thermal gelation), by curing (polymerization) or by evaporation of solvent.

The term "homogeneous solution" or "single phase" solution refers to a miscible mixture of liquid crystal and unset resin macroscopically appearing clear and homogeneous. The solution may be a liquid solution, a solid solution or in between. "Phase separation" or "phase separating" means altering the homogeneous mixture of liquid crystal and unset resin to cause the resin to separate as one phase and the liquid crystal to precipitate as microdroplets as a second phase. Phase separating may be effected by the cooling of a resin heated to a temperature effective to cause dissolution of liquid crystal, by the polymerization or curing of an unpolymerized or uncured resin, or by solvent evaporation. "Plasticizing" refers to the lowering of the transition or softening temperature of a thermoplastic resin caused by liquid crystal which remains in solution in the resin after phase separation of part of the liquid crystal as microdroplets.

In accordance with the invention, there is provided a new light modulating, liquid crystal-plastic material capable of transmitting and scattering light comprising microdroplets of liquid crystal dispersed in a thermoplastic resin, the microdroplets being of a size effective to scatter incident light when the optic axes of the microdroplets are essentially randomly aligned; and the microdroplets being formed by phase separation from a homogeneous solution of liquid crystal and thermoplastic resin. There is also provided a method of preparing a light modulating, liquid crystal-plastic material capable of transmitting and scattering light comprising the steps of forming a homogeneous solution of thermoplastic resin and liquid crystal, phase separating and spontaneously forming microdroplets of liquid crystal in the resin, and hardening the resin to form a matrix in which the microdroplets are dispersed.

The resin and the liquid crystal are selected to have the capability of forming a homogeneous solution so that microdroplets of liquid crystal can be precipitated by phase separation of the resin from the liquid crystal. A homogeneous solution of resin and liquid crystal may be achieved by mixing the liquid crystal with a miscible uncured resin and thereafter curing the resin to affect phase separation. A single phase solution may also be achieved by mixing the liquid crystal in a cured resin heated to a temperature effective to cause dissolution of the liquid crystal in the resin and thereafter cooling and solidifying the resin to affect phase separation. In the latter case, the liquid crystal may be either in its isotropic state or liquid crystalline state, and the resin may be in a liquid or near liquid state. A third way of achieving a homogeneous solution is by dissolving the resin in a solvent with which the liquid crystal is miscible and thereafter removing the solvent to effect phase separation.

The resin has an index of refraction $n_s$; the liquid crystal has an extraordinary index of refraction $n_e$ differing from its ordinary index of refraction $n_o$ so that incident light encountering an effective difference between $n_e$ and $n_s$ is scattered, while incident light encountering no effective difference between $n_o$ and $n_s$ is transmitted. Efficient scattering useful for light scattering displays occurs as long as the size of the liquid crystal droplet is on the order of the wavelength of the incident light, e.g., about 0.2–10 microns, and as long as the difference between $n_e$ and $n_s$ or $n_o$ is large enough to be an effective difference so as to cause optical inhomogeneity with visually perceptible scattering.

The liquid crystal may have an ordinary index of refraction $n_o$ matching the index of refraction $n_s$ of the set resin in the sense that incident light which encounters no effective difference between $n_s$ and $n_o$ will not be visually perceptibly scattered. To improve contrast between the light transmitting and scattering state, a slight difference between $n_o$ and $n_s$ may be desirable.

The preferred types of liquid crystal are nematic liquid crystals and smectic liquid crystals including ferro-electric liquid crystals. Such liquid crystals will align in a preferred direction upon the application of an electric or magnetic field. A sheet or film of resin containing nematic liquid crystal entrapped in generally spherical microdroplets will exhibit light modulating properties as disclosed in U.S. application Ser. No. 776,851.

The invention also provides for a memory material capable of being reversibly and selectively switched among wholly transparent, wholly opaque, or mixed states by the selective application of thermal and electric or magnetic fields. The memory material remains in the selected state upon removal of the fields. Accordingly, there is provided a light modulating material capable of transmitting and scattering light and having an erasable image memory comprising microdroplets of liquid crystal dispersed in a thermoplastic resin, the microdroplets being of a size effective to scatter incident light when the optical axes of the microdroplets are randomly aligned, the microdroplets being formed by phase separation from a homogeneous solution of the liquid crystal and the resin, and the liquid crystal having the characteristic of remaining in the liquid crystalline phase when the resin is softened so that the microdroplets are oriented by the application of an electric, magnetic or electromagnetic field and maintain the orientation when the resin is hardened and the field is removed. The material is preferably formed as a sheet or film.

Orientation of the optic axes of the liquid crystal droplets is achieved when the long axes of all the droplets point in the same direction within the sheet or film; this, in turn is achieved when the individual liquid crystal molecules point in generally the same direction (orientational order). In a sheet or film of microdroplets of nematic liquid crystal in the unoriented state, the individual molecules within a given droplet point in generally the same direction, but the direction of pointing varies from droplet to droplet. The individual molecules of smectic liquid crystal droplets in the unoriented state do not point in the same direction, but are gathered into focal conic domains; each droplet exhibits an overall focal conic texture. Oriented liquid crystals in the nematic phase have no positional order in that although they all point in generally the same direction from droplet to droplet, their positions relative to one another are random within the oriented state. Oriented liquid crystals in the smectic phase, however, have positional order in addition to orientational order in that not only do they point in generally the same direction, but they do so positioned in layers. Oriented liquid crystal molecules in the smectic A phase are generally parallel to one another within a given layer and perpendicular to the layers. Liquid crystal molecules in the smectic C phase are longer than the thickness of the layer so that the molecules may be described as tilted at a characteristic angle relative to the layer; oriented smectic C liquid crystals have positional order in that the molecules within the layers tilt at generally the same angle relative to one another and from layer to layer.

Application of an electric field to droplets of nematic liquid crystals having positive dielectric anisotropy causes the microdroplet director to reorient parallel to the field but does not effect positional order. Removal of the field results in the director returning to its original random orientation. Application of an electric field to droplets of smectic A liquid crystal in the unoriented or focal conic state causes orientation of the liquid crystal directors parallel to the field and of the layers perpendicular to the field; the orientation persists upon field removal.

Since smectic liquid crystals in layers are capable of memory without an applied field, a return to the focal conic orientation is achieved by the application of thermal energy.

In accordance with the present invention, image memory is achieved by the application of an external field to the film or to a selected area of the film. The area may be in any desired shape, such as an alphanumeric character or the like, or it may include the entire surface.

In the case of a film having microdroplets of nematic liquid crystals with positive dielectric anisotopy, image memory is achieved by selecting a nematic liquid crystal with a liquid crystalline to isotropic phase transition temperature above the softening point of the resin, softening the resin, applying a field to orient the liquid crystal droplets in the softened resin, and then rehardening the resin in the presence of the field so that the droplets in the hardened resin remain oriented upon removal of the field. A field applied normal to the film surface aligns the optic axes of the liquid crystal droplets within the selected area in the direction of the field, i.e., normal to the surface. The aligned nematic liquid crystal interacts with the softened resin in such a way that rehardening the resin in the continued presence of the field results in the optic axes of the liquid crystal droplets within the selected area retaining their parallel alignment in the direction normal to the film's surface upon removal of the field due to the conformation of the resin.

In the case of a film having microdroplets of smectic liquid crystal, image memory may be achieved by simply applying a field to orient the randomly aligned, focal conic texture droplets within a selected area and thereafter removing the field. The droplets retain the orientation upon removal of the field. A field applied normal to the film surface aligns the droplets in the same direction, i.e., normal to the surface.

Light normally incident upon the areas of the material where the liquid crystals are aligned normal to the surface will not detect an effective difference between the ordinary index of refraction $n_o$ of the liquid crystal and that of the resin $n_s$; these areas will appear clear and will remain clear indefinitely. Conversely, light incident upon non-selected areas, where the droplets of liquid crystals are randomly aligned, will experience a large difference between the extraordinary index of refraction $n_e$ of the liquid crystal and that of the resin $n_s$; the non-selected areas will appear opaque and remain opaque indefinitely. Where the selected area is in the shape of an alphanumeric character, for instance, the character will appear clear and the area surrounding the character will be opaque. When the entire surface of the nematic liquid crystal softened film is exposed to an aligning electric or magnetic field and rehardened in the presence of the field, the entire film will remain clear. Similarly, exposing the entire surface of a smectic liquid crystal film to an aligning field causes the entire film to be clear. A clear smectic film can be further manipulated to achieve an opaque character on a clear background by the application of thermal energy to a selected area in the shape of the desired character. Application of thermal energy causes the smectic liquid crystals in the selected area to return to the random, focal conic scattering state.

Images may be erased and the entire film returned to the scattering, opaque state by warming the film. For nematic films, the warming should be to a temperature above the softening point of the resin. Warming the film above the softening point reverses the changes in the resin and causes the liquid crystal droplets to return to a random arrangement. Rehardening the resin results in a material that will scatter incident light and appear opaque.

Droplets of nematic liquid crystal may be elongated by the application of mechanical stress, such as stretching or shearing, while the temperature of the resin is above its softening point and by maintaining the stress while the film is rehardened. The stress may be removed once the temperature is below the softening point and the droplets will remain elongated along the direction of the mechanical stress. Where the mechanical stress aligns the droplets parallel to the surface of a sheet, for instance, the sheet will polarize incident light.

An electromagnetic beam may be used to switch a clear film to opaque. The absorption of the energy in the electromagnetic beam incident on the film can cause it to soften so that the liquid crystals within the film return to the random, scattering state. A dye which absorbs electromagnetic radiation may be included in the film. For instance, a dye may be incorporated which absorbs in the infrared radiation range. A film having such a dye would be warmed by absorbing the infrared component of incident electromagnetic radiation while the electrical component of the incident electromagnetic radiation would align the optic axes of the droplets in the plane of the film. The film would then scatter and would remain in the scattering state when the source of radiation was removed.

Optically switchable materials can be fabricated with films prepared by curing in the presence of an applied field or by straining so that the extraordinary index of refraction, $n_e$, is aligned normal to the surface of the film. Such a film is clear and transmits light at normal light intensities. Incident light of sufficiently high intensity will cause the liquid crystals to reorient so that the optic axes of the microdroplets is switched to a direction in the plane of the film. This film will scatter light and appear opaque. The film acts as a non-linear optical device to be used as a protective coating to a high intensity electromagnetic source or as a device in optical computing. A non-linear optical response is also possible in which high intensity incident light changes the value of the refractive indices of the liquid crystal relative to the index of the resin.

Still other features and advantages will become apparent to those skilled in the art from the following description of the best modes of the invention and the accompanying drawings.

BEST MODE FOR CARRYING OUT THE INVENTION

The new material of the invention is prepared by the phase separation of a homogeneous liquid crystal resin solution. Homogeneous solutions may be prepared by mixing together an uncured resin, a binder and a liquid crystal miscible in the uncured resin-binder mixture; by mixing a liquid crystal with a cured resin heated to a temperature effective to cause dissolution of the liquid crystal into the resin; or by mixing a liquid crystal with a cured resin in a solvent with which the liquid crystal is misible. Phase separation is effected by, respectively, curing, cooling (thermal gelation), and solvent evaporation. Setting or hardening of the resin matrix is effected after phase separation by further curing, cooling or solvent evaporation, respectively.

The phase separation processes are all characterized by a starting material comprising resin and liquid crystal in a homogeneous or single phase material. The solution is altered so that phase separation occurs. Individual microdroplets of liquid crystal must form during the separation of the phases but before complete setting or solidification of the resin phase.

For thermal gelation phase separation, preferred thermoplastic resins dissolve liquid crystal at temperatures below about 200° C. in order to avoid thermal decomposition of the liquid crystal during phase separation. An equilibrium phase diagram of the binary mixture of liquid crystal and resin is shown schematically in FIG. 1. $T_1$ is the temperature above which the liquid crystal-resin mixture forms a single phase, homogeneous solution at all compositions; $T_2$ is the temperature at which the mixture is set or solidified. Region B is the miscibility gap where phase separation and microdroplet formation occur before the resin sets. Region A, outside the miscibility gap, is the homogeneous solution. Point Y illustrates that a 50/50 mixture will enter the miscibility gap, i.e., start to phase separate and form in situ droplets, at $T_1$. Point $X_1$ illustrates that an approximately 67/33 mixture will be a homogeneous solution at $T_3$; point $X_2$ illustrates that the mixture will enter the miscibility gap or microdroplet formation stage at $T_4$ and point $X_3$ illustrates the mixture will set at $T_2$.

Figure 2:
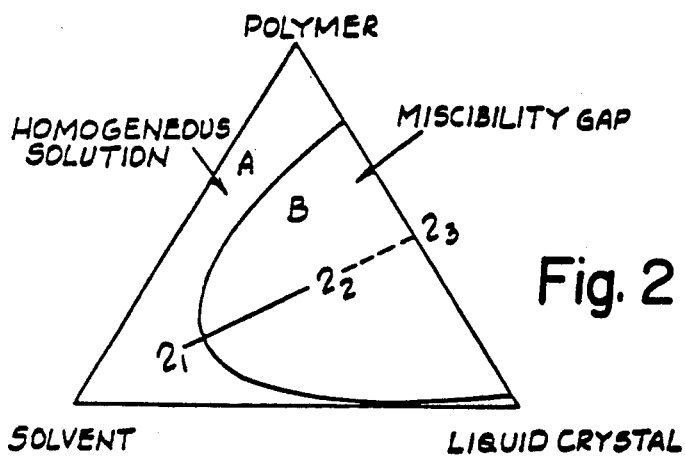
FIG. 2 is a schematic illustration of the equilibrium phase diagram of a ternary mixture of solvent, liquid crystal and resin.

For solvent evaporation phase separation, preferred thermoplastic resins are soluble in a solvent or mixture of solvents with which the liquid crystal is miscible. FIG. 2 illustrates an equilibrium phase diagram of the ternary mixture of solvent, liquid crystal and resin. At proportions in region A, the mixture is homogeneous; at proportions in region B, the mixture has reached the miscibility gap and microdroplet formation occurs. Through solvent evaporation, a mixture starting at point $Z_1$, will proceed along line $Z_1$, $Z_2$ to form a film having final composition $Z_3$.

Solvent evaporation is useful for coating objects with a liquid crystal containing film. If, however, an electrically responsive device in the form of a sheet of liquid crystal-plastic material between transparent electrode plates is desired, it is difficult to form the sheet by evaporation of the solvent from between the plates. In this case, solvent evaporation is used to form bulk material which is then placed between the plates, heated to flow between the plates and then cooled in the same manner as for thermal gelation.

Figure 1:
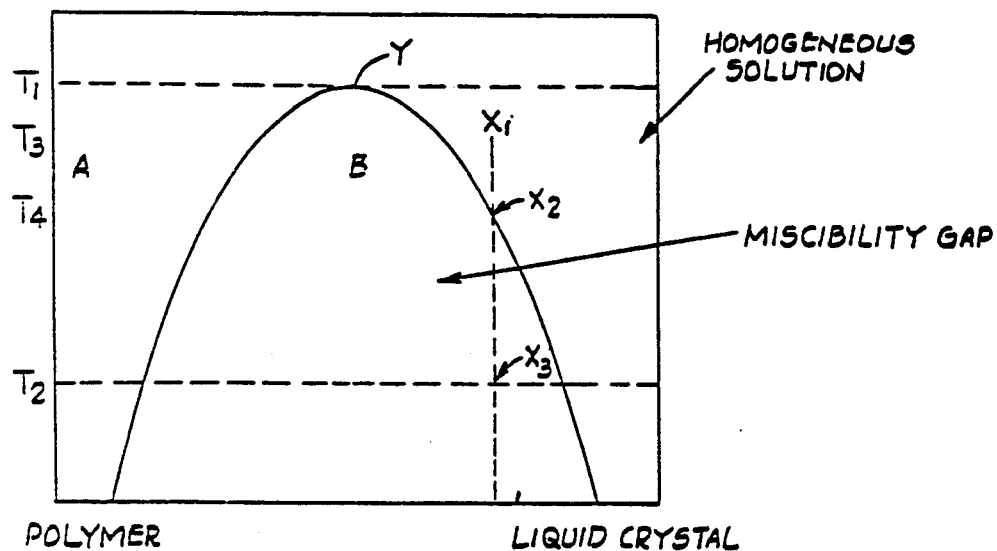
FIG. 1 is a schematic illustration of the equilibrium phase diagram of a binary mixture of liquid crystal and resin.

The solvent evaporation technique is especially useful for resins having such a high transition temperature that at temperatures above $T_1$ on FIG. 1, the liquid crystal is degraded. By forming bulk liquid crystal-resin material by solvent evaporation, the liquid crystal acts as a plasticizer, lowering $T_1$ to a temperature below the degradation temperature of the liquid crystal. The plasticizing effect appears due to a portion of the liquid crystal remaining in solution in the set resin. Thus by plasticizing a resin, a material is achieved which can be softened and hardened repeatedly by thermal gelation techniques without degradation of the liquid crystal.

Useful thermoplastic resins include modified epoxies; polystyrenes which soften in a transition temperature range of a about 60° to 100° C., e.g., polymers of α-methyl styrene and vinyl-toluene; the polymers of isobutylene, butadiene and methylbutene having softening points in the range of 20° to 40° C.; and the like. These may also be used to form co-polymers having a wide range of softening points.

One suitable resin is a modified epoxy resin prepared to have a transition temperature in a desired temperature range. A normally thermosetting epoxy resin is converted to a resin having a selected transition temperature by substitution of a non-crosslinking curing agent, such as a monoalkylamine, in the place of a cross-linking curing agent. The temperature at which a glass transition of a particular resin occurs may be adjusted by the choice of the substance used to cure the resin. Short chained alkylamines result in epoxies with relatively higher softening points than those cured with long chain alkylamines, e.g., the use of propylamine will result in an epoxy with a higher softening point than one cured with hexylamine. Alkyl branching affects the softening point by lowering it, e.g., epoxies formed from n-butylamine have a higher softening point than those formed from branched t-butylamine.

The ratio of uncured epoxy to alkylamine determines the chain length of the resultant cured resin. The main chain lengths are longest at a 1:1 ratio by equivalents of epoxy to alkylamine. As the ratio diverges from 1:1 toward either more epoxy or more alkylamine, the main chain length shortens.

The ultimate properties of the cured resin may be tailored to specific needs by the choice of the type of alkylamine as well as the proportions of alkylamine to epoxy. A relatively hard, stiff resin is obtained with longer main chain lengths and shorter alkylamine chain lengths. For instance a 1:1 resin made with propylamine yields a stiffer cured resin than a 1:1 resin made with hexylamine.

The transition temperature range determines the temperatures at which the write/erase phenomena can occur. In the sense used here, write means heating a resin containing a liquid crystal, applying a patterned field to align the optic axes, and cooling the resin in the presence of the field to write an image in the form of the pattern; erase means heating a resin having an image written on it and cooling the resin without a field to erase the image. Higher write/erase temperatures are achieved with longer main chain lengths and shorter alkyl chain lengths. Decay time (storage time) of an image is increased under the same conditions which yield higher write/erase temperatures, i.e., long main chain and short alkyl chain.

Other curing agents than alkylamines may be used as long as they do not result in significant crosslinking in the cured resin so as to prevent softening upon the application of heat or at a desired temperature. Such other suitable binders (curing agents) are those having only two active hydrogens, such as diols and diacids.

The effect of varying the main chain length of the cured resin material on the transition temperature range was assessed by making resins with various EPON 828 (Lot #8GHJ-52 - Miller Stephenson Co., Inc., Danbury, Conn. 06810) to hexylamine (HA) ratios as seen in Table I.

TABLE I

| MIXTURE | WT EPON (g) | WT HA (g) | EQ EPON/EQ HA |
| --- | --- | --- | --- |
| 1 | 1.850 | 0.715 | 1:1.374 |
| 2 | 2.492 | 0.770 | 1:1.100 |
| 3 | 2.489 | 0.734 | 1:1.050 |

Macroscopic observation of the three resultant resins cured at 65° C. for three days and cooled to room temperature revealed that all were fairly equally hard solids. Macroscopic observation of the three resins heated in an oven to 82° C. for 10 minutes is recorded in Table II.

TABLE II

| MIXTURE | RELATIVE HARDNESS | DESCRIPTION |
| --- | --- | --- |
| 1 | softest | viscous liquid |
| 2 | medium | viscous liquid |
| 3 | hardest | rubbery solid |

The effect of varying the main chain length of the cured resin material containing liquid crystal on display characteristics was assessed by comparing mixtures containing about 33% liquid crystal E7 as in Example 1, below, and about 67% EPON 828 with hexylamine (HA) in various EPON/HA ratios; the ratios of EPON to HA and percentage of liquid crystal are shown with the cured resin alone in the same ratios in Table III.

TABLE III

| MIXTURE | EQ EPON/EQ HA | % (by wt) E7 |
| --- | --- | --- |
| 1 | 1:0.753 | 33.6 |

TABLE III-continued

| MIXTURE | EQ EPON/EQ HA | % (by wt) E7 |
|---|---|---|
| 2 | 1:0.899 | 34.6 |
| 3 | 1:1.008 | 33.2 |
| 4 | 1:1.107 | 33.4 |
| 5 | 1:1.284 | 33.7 |
| 6 | 1:1.502 | 33.2 |
| 7 | 1:0.509 | 33.2 |

These mixtures were cured at 50° C. for three days. Macroscopic observation of the EPON/HA mixtures at room temperature (R.T.) and at 50° C. yielded the results shown in Table IVA. Table IVB describes the light scattering properties at 3° C., room temperature and 50° C., and the physical state at 3° C. and room temperature of EPON/HA/E7 mixtures of Table III.

TABLE IVA

| Mixture | R.T. | 50° C. |
|---|---|---|
| 1 | hard solid | easily deformed |
| 2 | hard solid | difficult to deform |
| 3 | hard solid | very difficult to deform |
| 4 | hard solid | difficult to deform |
| 5 | slightly sticky, rubbery | soft, drawable |
| 6 | flexible, rubbery | soft, drawable |
| 7 | sticky, rubbery | easily drawable |

TABLE IVB

| | Light Scattering | | | Physical State | |
|---|---|---|---|---|---|
| | 3° C. | R.T. | 50° C. | 3° C. | R.T. |
| 1 | op | op | cl | hard | rubbery |
| 2 | op | op | cl | hard | hard, rubbery |
| 3 | op | op | cl | hard | soft |
| 4 | op | op | cl | hard | hard, rubbery |
| 5 | op | op | cl | hard, rubbery | soft, rubbery |
| 6 | op | op | cl | soft | viscous liquid |
| 7 | pop | cl | cl | soft | viscous liquid | op = opaque
cl = clear
pop = partially opaque

The effect of various amines on the light scattering properties, image storage times and write/erase temperatures of various liquid crystals in EPON 828 was assessed by preparing 33% liquid crystal (by weight) with 67% EPON/Amine in a 1:1 equivalent ratio. The various mixtures were cured in bulk at 65° C. for 4 hours and allowed to cool to room temperature. Tables VA and VB summarize light scattering properties at room temperature. Resins made with straight chain propylamine through hexylamine (1, 2 and 4) were hard and difficult to deform at room temperature, whereas the heptylamine (5) resin was more easily deformed and the octylamine (6) resin was tacky.

TABLE VA

| | Amine | Liquid Crystal | | | | |
|---|---|---|---|---|---|---|
| | | E-7 | E-31 | E-44 | K-12 | K-18 |
| 1. | propylamine | S/PS | C | S/PS | C | X |
| 2. | n-butylamine | S/PS | X | S/PS | C | S |
| 3. | iso-butylamine | S/PS | C | S/PS | C | S/PS |
| 4. | hexylamine | S/PS | C | S | C | X |
| 5. | heptylamine | S | X | S | C | C |
| 6. | octylamine | C | C | C | C | C |

C = clear
X = semi-clear
S = scattering
S/PS = scattering with phase separation

The liquid crystals in Table VA were as follows:

E-7, as in Example 1, below, having a crystal to nematic liquid crystal phase transition temperature of −10° C. and a liquid crystal to isotropic phase transition temperature of 60.5° C.

E-31, a proprietary mixture of cyanobiphenyls and a non-cyano biphenyl ester available from EM Chemicals and having a crystal to nematic crystal phase transition temperature of −9° C. and a liquid crystal to isotropic phase transition temperature of 61.5° C.

E-44, a proprietary mixture of cyanobiphenyls, a cyanoterphenyl and a non-cyano biphenyl ester available from EM Chemicals and having a crystal to nematic liquid crystal phase transition temperature of −60° C. and a liquid crystal to isotropic phase transition temperature of 100° C.

K-12, 4-cyano-4'-butylbiphenyl, having a crystal to nematic liquid crystal phase transition temperature of 48° C.

K-18, 4-cyano-4'-hexylbiphenyl, having a crystal to nematic liquid crystal phase transition temperature of 14.5° C. and a liquid crystal to isotropic phase transition temperature of 29° C.

TABLE VB

| | Amine | Liquid Crystal | | | | |
|---|---|---|---|---|---|---|
| | | K-21 | K-24 | M-15 | M-18 | M-24 |
| 1. | propylamine | S/PS | S/PS | C | S | S |
| 2. | n-butylamine | S | S/PS | C | S | S |
| 3. | iso-butylamine | S/PS | S/PS | C | C | S |
| 4. | hexylamine | S | S | C | S | S |
| 5. | heptylamine | X/PS | S | S | S | S |
| 6. | octylamine | C | C | C | C | S |

C = clear
X = semi-clear
S = scattering
S/PS = scattering with phase separation

The liquid crystals in Table VB were as follows:

K-21, 4-cyano-4'-heptylbiphenyl, having a crystal to nematic liquid crystal phase transition temperature of 30° C. and a liquid crystal to isotropic phase transition temperature of 42.8° C.

K-24, 4-cyano-4'-octylbiphenyl, having a crystal to smectic A liquid crystal phase transition temperature of 21.5° C., a smectic C to nematic liquid crystal phase transition temperature of 33.5° C. and a nematic liquid crystal to isotropic phase transition temperature of 40.5° C.

M-15, 4-cyano-4'-pentoxybiphenyl, having a crystal to nematic liquid crystal phase transition temperature of 48° C. and a liquid crystal to isotropic phase transition temperature of 68° C.

M-18, 4-cyano-4'-hexoxybiphenyl, having a crystal to nematic liquid crystal phase transition temperature of 57° C. and a liquid crystal to isotropic phase transition temperature of 75.5° C.

M-24, 4-cyano-4'-octoxybiphenyl, having a crystal to smectic A liquid crystal phase transition temperature of 54.5° C., a smectic A to nematic liquid crystal phase transition temperature of 67.0° C. and a nematic to isotropic phase transition temperature of 80.0° C.

Aliquots for qualitative assessment of image storage times and write/erase temperatures were prepared with mixtures 1–2 and 4–6 between patterned electrode slides as in Example V, below. Storage time (decay of image) and write/erase temperatures decreased with increasing alkylamine length, and also with decreasing hardness of the resin.

Fabrication of displays made in accordance with the method of the present invention is much easier than with previous methods. A display can be made from a piece of cured material by warming it above the softening point temperature and then sandwiching it between conductive glass or plastic plates spaced apart at a selected thickness. If a display of another shape or thickness is desired, the previous display may be disassembled and the liquid crystal-thermoplastic resin may be reshaped by heating it until it is soft, forming it into the desired shape and thickness and then cooling it to form a display with the desired characteristics. The material also lends itself to hot melt-type processing wherein hot thermoplastic resin and hot liquid crystal need merely be contacted to form a homogeneous solution, as by dipping a thin, heated sheet of resin into a hot liquid crystal bath. Displays may then be reworked simply by reheating above the softening point. The ability to be reworked and reused lessens waste and increases the efficiency of the manufacturing process.

Figure 3:
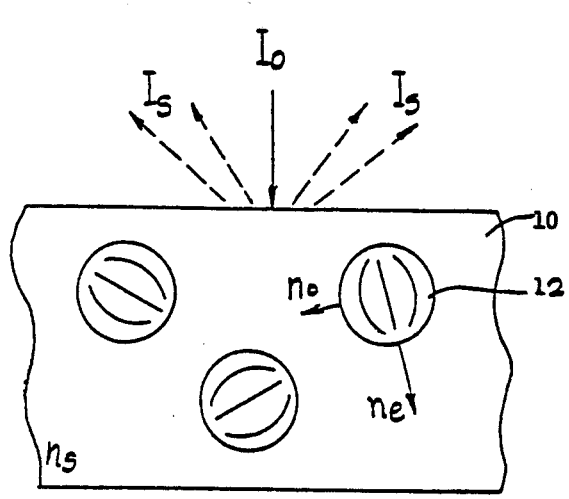
FIG. 3 is a fragmentary, cross-sectional, schematic illustration of the thermoplastic resin containing droplets of nematic liquid crystal in the opaque state.

The material of the present invention also offers the advantage of a memory feature. FIG. 3 illustrates a material of the invention consisting of a cured thermoplastic resin 10 in its set or hardened state which has droplets of nematic liquid crystal 14. The liquid crystal is selected to have a liquid crystalline to isotropic phase transition temperature above the softening temperature of the resin and to have an ordinary index of refraction $n_o$ equal to or closely matching the index of refraction of the resin $n_s$. As shown in FIG. 3, the liquid crystals within the droplets 14 have no preferred direction in which to align, so that the extraordinary indices of refraction $n_e$ are randomly oriented within the resin. Incident light $I_o$ experiences a mismatch between the indices $n_s$, $n_e$ and is scattered, as indicated by $I_s$. The material in FIG. 3 appears opaque.

Figure 4:
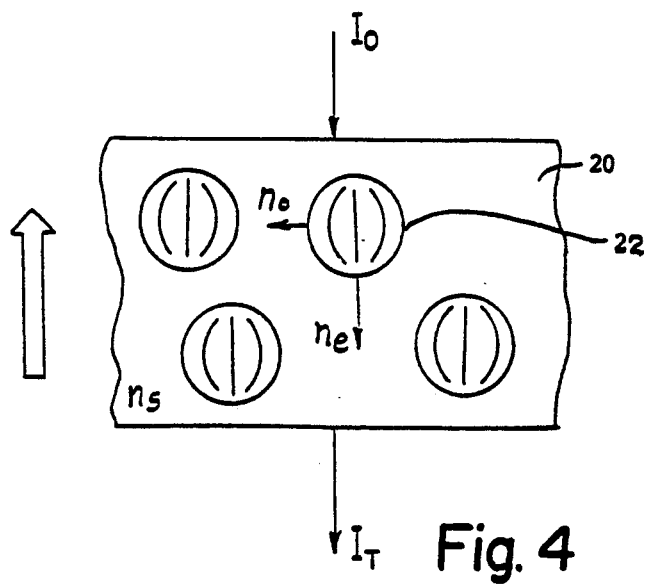
FIG. 4 is an illustration similar to FIG. 3 except that the material is shown in the transparent state.

FIG. 4 illustrates the material of FIG. 3 after the resin 20 containing liquid crystal droplets 24 has been softened, subjected to an electric field E in the illustrated direction, rehardened in the presence of the field, and the field removed. The liquid crystal directors of the droplets 24 are aligned in the direction the field was applied. Normally incident light $I_o$ detects no mismatch between the ordinary index of refraction $n_o$ and that of the resin $n_s$ and is transmitted through the material as $I_t$. The material of FIG. 4 appears clear and remains clear indefinitely.

Figure 5:
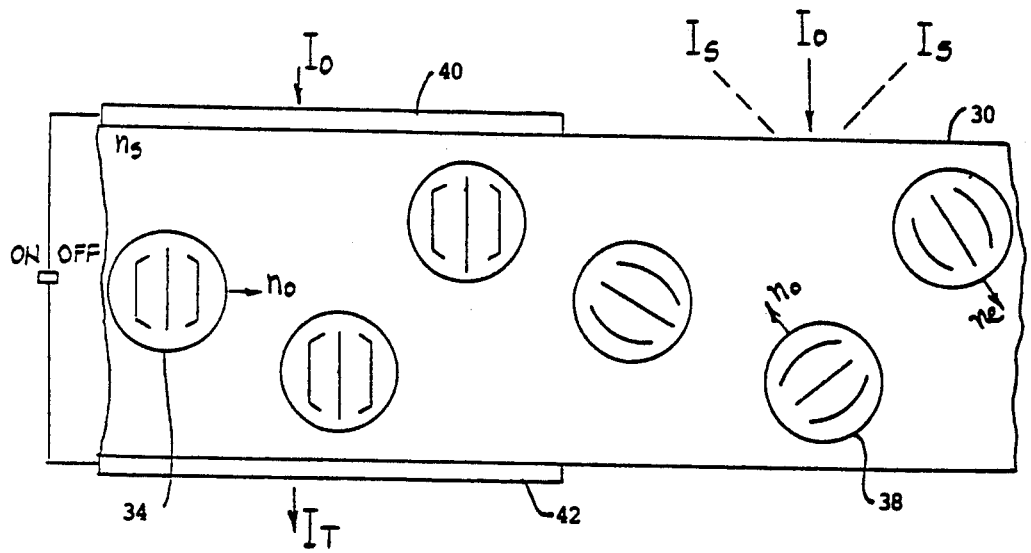
FIG. 5 is a fragmentary, cross-sectional, schematic illustration of the thermoplastic resin containing droplets of nematic liquid crystal with a portion between electrically actuated electrodes.

FIG. 5 illustrates the preparation of a material which will exhibit contrasting opaque and clear areas, such as for alphanumeric displays. A sheet as in FIG. 3, heated to a temperature above the softening point of the resin 30, but below the liquid crystalline phase to isotropic phase transition temperature of the liquid crystal, is exposed to an aligning electric field between electrodes 40, 42 laid out in a desired pattern. The sheet may also be heated to above the liquid crystalline to isotropic phase transition temperature and then allowed to cool to a temperature below the isotropic to liquid crystalline phase transition, but above the softening point of the polymer for the aligning step. The liquid crystal in the droplets 34 of the softened resin 30 aligns in the direction of the electric field, i.e., normal to the surface of the sheet. The alignment of the liquid crystal causes the alignment of the optical axis of the droplet 34 in the same direction. The optical axes of droplets 38 not exposed to the field do not align. Subsequent cooling of the material to a temperature below the softening point while the field is maintained across electrodes 40, 42 yields the material illustrated in FIG. 6.

Figure 6:
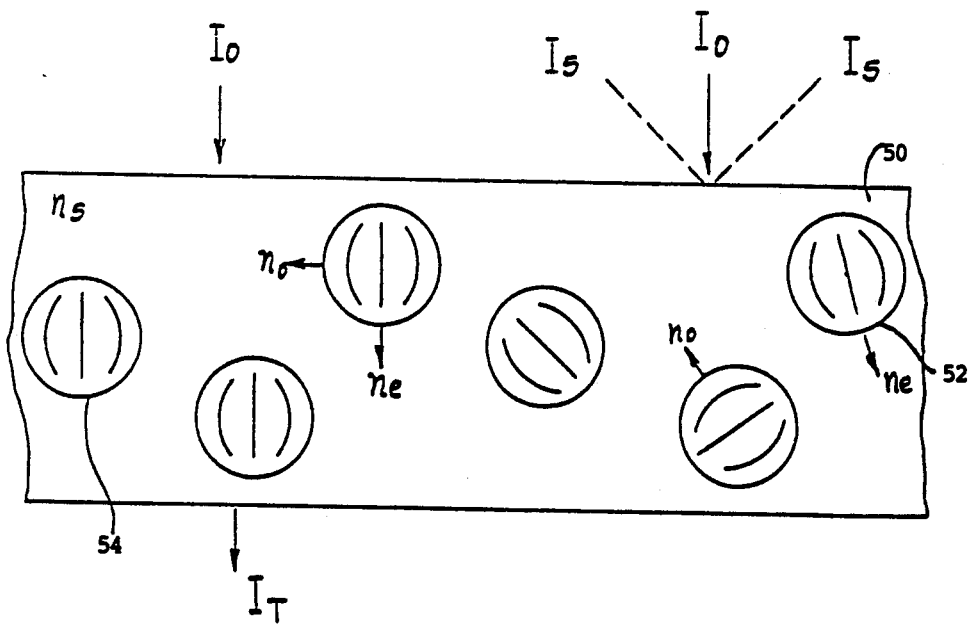
FIG. 6 is an illustration similar to FIG. 5 with the current removed.

FIG. 6 shows the material of FIG. 5 after the resin 50 is rehardened and the electric field removed. Light incident on the material is either transmitted or scattered depending upon the match or mismatch of indices of refraction of the resin and that of the liquid crystal as detected by the incident light. Light $I_o$ incident upon the resin 50 with aligned optical axes of droplets 54 experiences no mismatch of indices $n_s$, $n_o$ and is transmitted, causing the area containing droplets 54 to appear clear. Light $I_o'$ incident upon the resin 50 with randomly oriented droplets 52 experiences large difference between the index of the polymer $n_s$ and the overall randomly oriented extraordinary index $n_e$ and is scattered, as at $I_s'$, causing the area containing droplets 52 to appear opaque.

The material of FIGS. 3-6 has a number of applications. It can, for instance, act as a temperature monitor, signaling a visual alarm if the ambient temperature of the material has risen above a certain selected value. The alarm is visible even if the ambient temperature returns below the selected value. A resin may be used, for example, with a softening temperature of 0° C. A film of the resin can be affixed to a frozen item, such as food package. The film can be prepared with a suitable image, such as "OK". The image "OK" will remain as long as the film is maintained below 0° C. If the temperature of the item is raised above 0° C., however, the image is erased and will not reappear even if the item is subsequently refrozen.

The material of the invention may be used as an erasable label. An image can be impressed upon the material with the application of a proper voltage and heat. The material will maintain the image until once again heated. Alphanumeric information can be written with patterned seven segment electrodes. A character is written by addressing the appropriate segments with a voltage while the film is heated and then cooled. Such labels would be useful for pricing labels on store shelves. The material could be sandwiched between plastic sheets with patterned conducting surfaces. An additional thin metallic layer on the plastic may be used for resistive heating. An image may be impressed on such a label by charging the appropriate segments while heating and cooling the film. Electrical contacts on the edge of such a label would allow the label to be addressed by a simple hand-held unit which would be programmed to charge the appropriate segment while providing the current to heat the film. This would offer a fast, simple means of updating displayed retail prices.

The material of the invention can also be used to form multiplexed flat panel displays with a larger number of picture elements than can be obtained with devices without the memory feature of the present invention. The material of the present invention does not require an active matrix to maintain an image. Further, only the picture elements to be altered within an image need to be addressed. Clear picture elements are formed by warming and cooling in the presence of an external field, and opaque elements are formed by warming and cooling in the absence of an external field.

Figure 7:
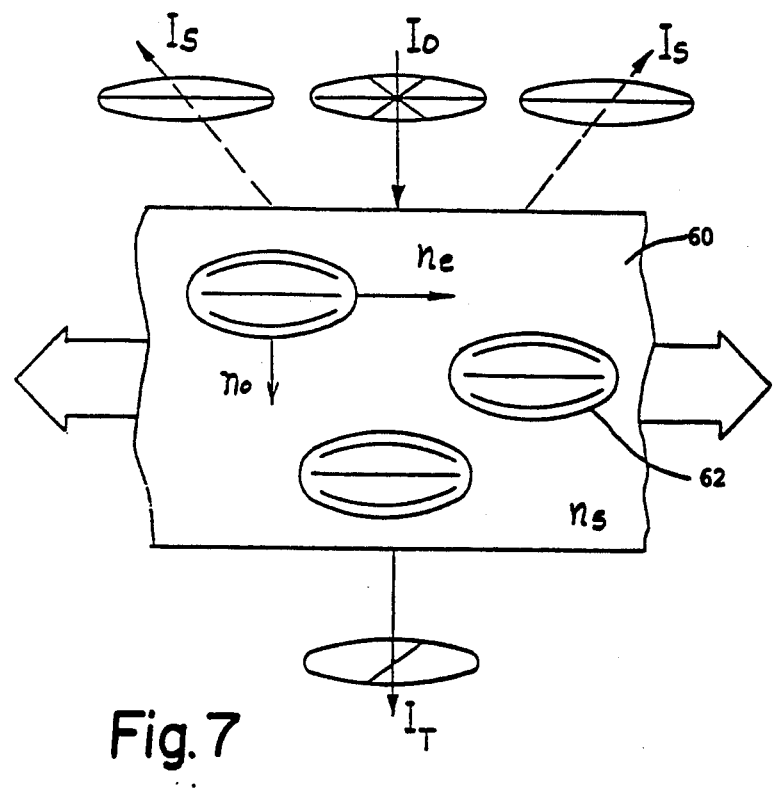
FIG. 7 is a fragmentary, cross-sectional, schematic illustration of the thermoplastic containing droplets of nematic liquid crystal elongated by the application of mechanical stress.

FIG. 7 illustrates a scattering polarizer obtained when the material of FIG. 3 is heated above the softening point of the resin 60 and rehardened while subjected to mechanical stretch in the direction of the arrows, preferably in the plane of the film. The stretch elongates the droplets 62 in the softened resin 60 in the direction of stretch. The optic axes of the liquid crystal droplets 62 align along the long axes of the ellipses, so that the direction of the extraordinary index of refraction $n_e$ of the liquid crystal is parallel to the surface of the film. One component of incident plane polarized light $I_o$ parallel to the long axes of the droplets in the film will detect a mismatch between the extraordinary index of refraction $n_e$, and the $n_s$ of the resin and will be scattered, as at $I_s$. Another component of plane polarized light perpendicular to the long axis will experience no such mismatch between $n_o$ and $n_s$ and will be transmitted polarized as at $I_p$.

Figure 8:
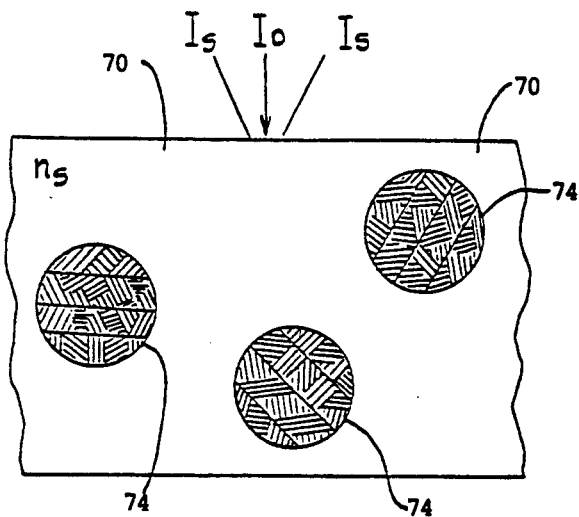
FIG. 8 is a fragmentary, cross-sectional, schematic illustration of the thermoplastic resin containing droplets of smectic A liquid crystal in the opaque, focal conic texture state.

FIG. 8 shows a resin 70 which has microdroplets of smectic A liquid crystal 74. As shown in FIG. 8 the liquid crystals are in the focal conic state with no preferred direction of alignment, so that the $n_e$ are randomly oriented within the resin. Light incident on the material, as at $I_o$, detects a mismatch between $n_s$ and $n_e$ and is scattered, as at $I_s$. The material appears opaque.

Figure 9:
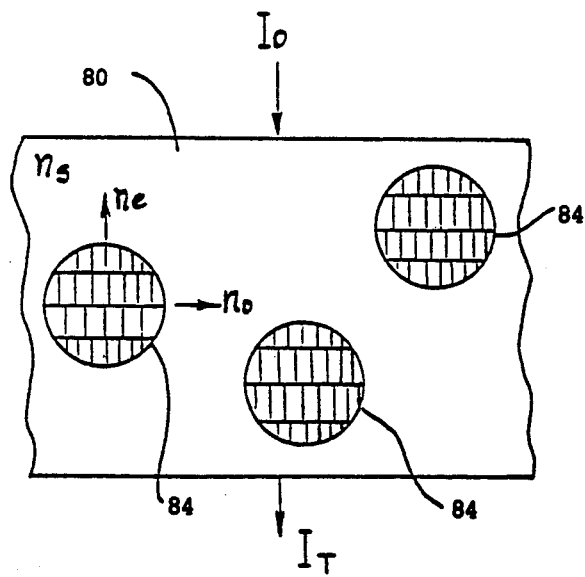
FIG. 9 is an illustration similar to FIG. 8 except that the material is shown in the transparent state.

FIG. 9 shows the material of FIG. 8 after the resin 80 containing smectic A liquid crystal droplets 84 has been subjected to an electric field E in the illustrated direction, and the field removed. The layers are aligned perpendicular to the direction the field is applied and the long axis of the liquid crystal molecules are normal to the film surface. Normally incident light $I_o'$ detects no mismatch between the indices $n_o$ and $n_s$ and is transmitted through the material as $I_t$. The material of FIG. 9 appears clear and remains clear indefinitely.

The best modes of the invention are further illustrated and described by the following specific example.

EXAMPLE I

A switchable light scattering film was prepared by solvent evaporation from a solution of a bulk preparation containing liquid crystal and EPON 828 cured with hexylamine. 4 grams EPON 828 were mixed with 1.124 grams hexylamine (HA) (1:1 equivalent ratio). 1.179 grams of the EPON/HA mixture were added to 0.595 grams of liquid crystal E7 (available from EM Chemicals), a mixture consisting of (by weight) 4'-n-pentyl-n-cyanobiphenyl (5CB), 51%; 4'-n-heptyl-n-cyano-biphenyl (7CB), 21%; 4'-n-octoxy-4-cyano-biphenyl, 16%; and 4'-n-pentyl04-cyano-terphenyl, 12%; the mixture was cured at 65° C. over night and allowed to cool to room temperature. A 0.0188 gram slug of the cured mixture was mixed with 1.925 gram acetone. The resultant solution was cloudy due to the immiscibility of E7 with acetone. Thereafter 0.206 grams methanol was added and the solution became clear. The solution was stirred for 5 minutes after which time the solution was clear with no apparent undissolved material. The solution was poured on a conductive glass substrate and allowed to dry for 3 minutes. The resultant dry film was light scattering and opaque.

A switchable cell was constructed with the film by placing 26 um spacers on top of the film, and then clamping a second conductive surface on top of the spacers to form a sandwich. The resultant sandwich was heated at 85° C. for 5 minutes until the second conductive surface could be clamped to contact the spacers, and then cooled to room temperature. The 26 um thick film scattered light and was opaque; application of 30 volts caused the film to switch to a clear state.

EXAMPLE II

Light scattering cells were prepared by heating clear polymer polyacetyl beads .(Aldridge Chemicals) in a 10 ml vial to 200° C. and then adding liquid crystal E-7 as in Example I in a 2:1 ratio by weight of polymer to liquid crystal. The mixture was stirred and allowed to cool to room temperature. The cooled material was opaque white. Two cells were prepared by cutting 20 mg slugs from the bulk material and placing each slug between conducting plates with 10 um spacers. The plates were clamped together and placed on a hot plate at 200° C. until the material was clear. One cell was then rapidly cooled to 3° C. The other cell was slowly cooled overnight on the turned off hot plate. The cell rapidly cooled was less opaque and showed a bluish tint as compared to the cell slowly cooled. The bluish tint indicated a very small droplet size. This cell was switched to the clear state with a 100 volt current. The cell slowly cooled was switched to the clear state by a 50 volt current.

EXAMPLE III 0.292 grams of polystyrene were shaved off a block of clear polystyrene and placed in a 10 ml vial with 0.143 grams E7 as in Example I. The vial was placed in an oven at 170° C. for 15 minutes. The polystyrene did not melt, whereas the liquid crystal, in its isotropic state, appeared to be absorbed into the surface of the polystyrene. The vial was cooled to room temperature, the material was removed and cut in half with a razor blade. A surface layer approximately 7 mm thick was observed to be opaque and scattering. The layer was shaved off onto a patterned electrode glass slide with 18 mm spacers, covered with a second glass slide and clamped to make a sandwich as in Example I. The sandwich was returned to 170° C., heated until the shaved off layer flowed to form a film and the glass slides could be clamped to contact the spacers and then allowed to cool to room temperature. At room temperature, a light scattering opaque film was observed which was switched to a clear state with 70 volts.

EXAMPLE IV

A resin was prepared by mixing 1.850 g of EPON 828 with 0.715 g of hexylamine (1 equivalent EPON to 1.374 equivalents hexylamine). The mixture was cured in bulk in a 10 ml vial at 65° C. for 3 days. At room temperature, the cured material was a hard solid; it was difficult to deform when heated to 50° C. The cured material was heated to 130° C. for 10 minutes and became a flowable viscous liquid. Liquid crystal E7 as in Example I was heated to 130° C., above its isotropic transition temperature, and mixed with the viscous liquid cured material. One aliquot of the hot mixture was sandwiched between glass slides and allowed to cool to room temperature; another aliquot was sandwiched between glass slides and put immediately into a freezer at 0° C. The slide cooled to room temperature appeared opaque and light scattering. The slide cooled to 0° C. was clear and transmissive. Both slides were then examined with a microscope at 320×. The film allowed to cool to room temperature contained micron sized droplets (about 0.7 to 1.5 microns) of liquid crystal; the film cooled to 0° C. showed no droplets.

EXAMPLE V

A mixture of uncured resin and binder was prepared by thoroughly mixing one equivalent of EPON 828 with one equivalent of hexylamine. The liquid crystal E-7 was added to the uncured resin-binder mixture to form a 33% by weight solution. The mixture was sealed in a 10 ml vial and cured in bulk overnight at 65° C. The resulting material was inelastic and milky white (scattering) in appearance at room temperature.

The material was softened to a flowable state by warming it in the vial and maintaining it at about 100° C. for five minutes. An aliquot of the material was poured to form a film between glass slides spaced apart at 26 um by 26 um glass spacers. The glass slides were equipped with conducting electrodes laid out in a pattern to form the character ZERO. A electric field of 3 volts per micron thickness of film (about 80 volts) was established across the film. The film was then allowed to cool to room temperature and to reharden while the field was maintained. The field was removed and the resultant film displayed a clear transparent image of the ZERO pattern surrounded by an opaque, light scattering field. The ZERO remained clear for 2 days, showing no tendency to decay for 2 hours. Total decay and a return to the opaque state occurred after 7 days.

EXAMPLE VI

Bulk material was prepared and cured as in Example V. A 1 cubic centimeter slug of cured material was cut from the bulk with a razor blade, and placed on a patterned electrode bearing glass slide as in Example I with 26 um glass spacers. A second electrode bearing glass slide was placed over the slug and clamped in place to form a sandwich. The sandwich was heated with a hot air blower until the slug flowed to form a film and the glass slides could be clamped down to contact the spacers. An electric field of about 70 volts was establised across the film and the film was allowed to cool to room temperature to reharden. The resultant film behaved as the film described in Example V.

EXAMPLE VII

The film of Example VI having the image of the zero pattern was erased by warming for 2 minutes in a oven at about 100° C. When the film was cooled to room temperature in the absence of an applied field it appeared opaque. The cycle of imprinting a memory by the method of Example V and subsequently erasing the image by heating to 100° C. and cooling without a field was repeated successfully 10 times over a period of 7 days with no apparent deleterious effects.

EXAMPLE VIII

The film of Example V having the image of the zero pattern was heated in a oven to about 100° C. to erase the image, and, imprinted with another zero pattern by a field of about 70 volts maintained across the film until it cooled to room temperature. The film exhibited a transparent image of zero surrounded by an opaque, light scattering field. The patterned electrodes were removed and the film placed in a freezer at 0° C. The zero pattern remained clear in the opaque field and showed no tendency to decay for 30 days.

EXAMPLE IX

A light scattering film was prepared by mixing 20% by weight of ferro-electric liquid crystal W-7 (Displaytech, Boulder, Colo.).

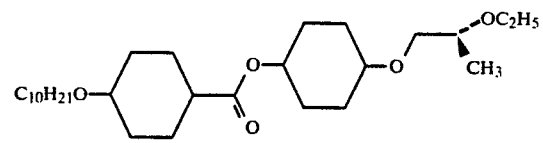

with 80% by weight of an equivalent EPON 828/hexylamine resin. The mixture was cured in bulk at 65° C. for 4 hours. A film between glass slides was prepared by warming the cured mixture to a viscous fluid, allowing it to flow between glass slides spaced apart at 26 um with 26 um spacers, cooling to room temperature. The resultant film was opaque and light scattering.

EXAMPLE X

A light scattering film was prepared by mixing 2.893gm EPON ($1.61 \times 10^{-2}$ equivalents) with 0.812 gm hexylamine ($1.61 \times 10^{-2}$ equivalents) and then taking a 0.327 gm aliquot and further mixing it with 0.170 gm liquid crystal M-24. This mixture was cured in bulk at 65° C. overnight and a 26 um cell was prepared as in Example VI. The resultant cell was opaque and scattering. It was switched to the clear state by the application of 1000 v and remained in the clear state after the voltage was removed. The cell was then heated with a hot air gun and allowed to cool to room temperature so as to return to the opaque state. The same cell was reheated to the clear state and recooled in the presence of 400 v. At room temperature the cell was clear and remained clear without the applied voltage for several hours.

Many modification and variations of the invention will be apparent to those skilled in the art in light of the foregoing detailed disclosure. Therefore, it is to be understood that, within the scope of the appended claims, the invention can be practiced otherwise than as specifically shown and described.

We claim:

1. A light modulating, liquid crystal-plastic material capable of transmitting and scattering light comprising:
    microdroplets of liquid crystal dispersed in a thermoplastic resin, said microdroplets being of a size effective to scatter incident light when the optical axes of said microdroplets are randomly aligned, and said microdroplets being formed by phase separation from a homogeneous solution of said liquid crystal and thermoplastic resin.

2. A liquid crystal-plastic material as claimed in claim 1 wherein said liquid crystal has a liquid crystalline to isotropic phase transition temperature above the softening temperature of the thermoplastic resin.

3. A liquid crystal-plastic material as claimed in claim 1 wherein said liquid crystal comprises a liquid crystal selected from the group consisting of nematic and smectic liquid crystals.

4. A light modulating, liquid crystal-plastic material capable of transmitting and scattering light and having an erasable image memory comprising:
    microdroplets of liquid crystal dispersed in a thermoplastic resin, said microdroplets being of a size effective to scatter incident light when the optical axes of said microdroplets are randomly aligned, said microdroplets being formed by phase separation from a homogeneous solution of said liquid crystal and said resin, and said liquid crystal having the characteristic of remaining in the liquid crystalline phase when the resin is softened so that the microdroplets are oriented by the application of an electric or magnetic field and maintain the orientation when the resin is hardened and the field is removed.

5. A method of making a light modulating, liquid crystal-plastic material capable of transmitting and scattering light comprising the steps of:
   forming a homogeneous solution of liquid crystal and a thermoplastic resin;
   phase separating and spontaneously forming microdroplets of liquid crystal in the resin; and
   hardening the resin to form a matrix in which said microdroplets are dispersed.

6. A liquid crystal-plastic material as claimed in claim 5 wherein said liquid crystal has a liquid crystalline to isotropic phase transition temperature above the softening temperature of the thermoplastic resin.

7. A liquid crystal-plastic material as claimed in claim 5 wherein said liquid crystal comprises a liquid crystal selected from the group consisting of nematic and smectic liquid crystals.

8. A method of making a liquid crystal-plastic material as claimed in claim 5 wherein the step of forming the homogeneous solution is carried out by dissolving the liquid crystal in the thermoplastic resin heated to a temperature effective to cause dissolution of the liquid crystal and wherein the step of phase separating and spontaneously forming microdroplets of liquid crystal is effected by cooling said solution.

9. A method of making a liquid crystal-plastic material as claimed in claim 5 wherein the step of forming the homogeneous solution is carried out by dissolving the liquid crystal and the resin in a solvent and the step of phase separating and spontaneously forming microdroplets of liquid crystal is effected by evaporating said solvent.

10. A method of making a liquid crystal-plastic material as claimed in claim 5 wherein the step of phase separating and spontaneously forming the microdroplets is effected by polymerizing said resin.

11. A method of making a liquid crystal-plastic material as claimed in claim 10 wherein resin comprises an uncured resin and a curing agent.

12. A method of making a light modulating, liquid crystal-plastic material comprising the steps of:
    forming a homogeneous solution of thermoplastic resin and liquid crystal; and
    polymerizing said resin while phase separating said liquid crystal to spontaneously form microdroplets of liquid crystal dispersed in a polymerized resin matrix.

13. A method of making a light modulating, liquid crystal-plastic material as claimed in claim 12 wherein the thermoplastic resin comprises an uncured resin and a curing agent.

14. A method of making a light modulating, liquid crystal-plastic material capable of transmitting and scattering light comprising the steps of forming a homogeneous solution by dissolving a liquid in a thermoplastic resin heated to a temperature effective to cause dissolution of the liquid crystal and cooling said solution while phase separating said liquid crystal to spontaneously form microdroplets of liquid crystal dispersed in a hardened resin matrix.

15. A method of making a light modulating, liquid crystal-plastic material capable of transmitting and scattering light comprising the steps of:
    forming a homogeneous solution by dissolving a thermoplastic resin and liquid crystal in a solvent; and
    evaporating said solvent while phase separating said liquid crystal to spontaneously form microdroplets of liquid crystal dispersed in a hardened resin matrix.

16. A method of making a light modulating, liquid crystal material having optical memory comprising the steps of:
    forming a homogeneous solution of liquid crystal and a thermoplastic resin, said liquid crystal having a liquid crystalline to isotropic phase transition temperature above the softening temperature of the resin;
    phase separating and spontaneously forming microdroplets of liquid crystal in the resin; and
    hardening the resin to from a matrix in which said microdroplets are dispersed.

17. The method as claimed in claim 16 wherein the liquid crystal comprises a liquid crystal selected from the group consisting of nematic and smectic liquid crystals.

18. A method of making a material having optical memory comprising the steps of:
    heating a thermoplastic resin containing dispersed microdroplets of liquid crystal, said liquid crystal having a liquid crystalline phase to isotropic phase transition temperature above the softening temperature of the resin;
    applying an electric or magnetic field sufficient to align the optical axes of the liquid crystal; and
    cooling the resin in the presence of said field to form microdroplets of liquid crystal which are optically aligned in the resin.

19. A method of preparing a material having optical memory comprising the steps of:
    softening a resin containing dispersed microdroplets of liquid crystal;
    orienting the liquid crystal microdroplets in a selected area of the resin; and
    rehardening the resin while maintaining the liquid crystal microdroplets in the oriented position.

20. A method of preparing a material capable of polarizing incident light comprising the steps of:
    softening a resin containing dispersed microdroplets of liquid crystal;
    stretching the resin to orient the microdroplets in the direction of stretch; and
    rehardening the resin while maintaining the stretch.

21. A method of plasticizing a thermoplastic resin useful for liquid crystal display devices comprising the step of lowering the softening temperature of the thermoplastic resin by forming a homogeneous solution of thermoplastic resin and liquid crystal, and phase separating microdroplets of liquid crystal from the solution so that a part of the liquid crystal is in the form of phase separated microdroplets and part of the liquid crystal remains in homogeneous solution.

22. The method as claimed in claim 21 including the further step of hardening the resin to form a matrix containing dissolved liquid crystals and dispersed microdroplets of liquid crystal.

* * * * *

UNITED STATES PATENT AND TRADEMARK OFFICE
CERTIFICATE OF CORRECTION

PATENT NO : 4,685,771
DATED : August 11, 1987
INVENTOR(S) : WEST et al.

It is certified that error appears in the above-identified patent and that said Letters Patent is hereby corrected as shown below:

Insert the following paragraph at column 1, line 5:

---The United States government has a paid-up license in this invention and may have the right in limited circumstances to require the patent owner to license others on reasonable terms as provided for by the terms of Grant DMR82-44468, awarded by the National Science Foundation.---

Signed and Sealed this

Fifteenth Day of December, 1998

*Attest:*

BRUCE LEHMAN

*Attesting Officer*

*Commissioner of Patents and Trademarks*